United States Patent
Bertsch-Frank et al.

(10) Patent No.: US 6,239,095 B1
(45) Date of Patent: May 29, 2001

(54) PROCESS FOR PREPARATION OF COATED PEROXYGEN COMPOUNDS

(75) Inventors: Birgit Bertsch-Frank, Gründau; Martin Bewersdorf, Gelnhausen; Lothar Kaiser, Heusenstamm; Rainer Kohlen, Wehrheim; Ralph Overdick, Hofheim; Michael Scheibe, Hanau, all of (DE)

(73) Assignee: Degussa-Huls Aktiengesellschaft, Frankfurt am Main (DE)

( * ) Notice: Subject to any disclaimer, the term of this patent is extended or adjusted under 35 U.S.C. 154(b) by 0 days.

(21) Appl. No.: 09/348,008

(22) Filed: Jul. 6, 1999

(51) Int. Cl.[7] .............................. C11D 3/00; C11D 17/00; A62D 3/00; C01B 15/00

(52) U.S. Cl. .................. 510/375; 510/442; 252/186.27; 252/186.32

(58) Field of Search ....................... 510/375, 442; 423/415.2; 252/186.25, 186.27, 186.32

(56) References Cited

U.S. PATENT DOCUMENTS

| | | | |
|---|---|---|---|
| 3,977,988 | * 8/1976 | Tokiwa et al. | 252/99 |
| 4,105,827 | 8/1978 | Brichard . | |
| 4,171,280 | * 10/1979 | Maddox et al. | 252/186 |
| 4,178,351 | * 12/1979 | Klebe et al. | 423/275 |
| 4,260,508 | * 4/1981 | Maddox | 252/99 |
| 4,970,804 | 11/1990 | Hüttlin . | |
| 5,258,133 | * 11/1993 | Chapple | 252/95 |
| 5,312,557 | * 5/1994 | Onda et al. | 252/99 |
| 5,681,807 | * 10/1997 | Honig et al. | 510/375 |
| 5,902,783 | * 5/1999 | Lagnemo et al. | 510/375 |

FOREIGN PATENT DOCUMENTS

| | | |
|---|---|---|
| 2166281 | 1/1995 | (CA) . |
| 2417572 | 11/1974 | (DE) . |
| 2622610 | 9/1986 | (DE) . |
| 3839723 | 7/1989 | (DE) . |
| 3806537 | 9/1989 | (DE) . |
| 97/19890 | 6/1997 | (WO) . |

OTHER PUBLICATIONS

WO 95/02555, Jan. 26, 1995.

* cited by examiner

Primary Examiner—Yogendra Gupta
Assistant Examiner—John M Petruncio
(74) Attorney, Agent, or Firm—Smith, Gambrell & Russell, LLP

(57) ABSTRACT

A process for the preparation of coated peroxygen compounds, in particular sodium percarbonate, by fluidized bed coating. By using a fluidized bed reactor with a radial inflow base, the passage openings of which allow the fluidized bed gas to emerge in the region of the opening at an angle of less than 35°, measured with respect to the horizontal, in the form of directed part streams, and in which are arranged spray nozzles, the pulse of which points in the same direction as the pulse of the fluidizing gas, it is possible to obtain products with an increased active oxygen stability. A circular reactor, the inflow base of which has lamellae overlapping like turbine blades and nozzles aligned in the direction of rotation of the fluidized bed is preferred.

11 Claims, 1 Drawing Sheet

PROCESS FOR PREPARATION OF COATED PEROXYGEN COMPOUNDS

INTRODUCTION AND BACKGROUND

The present invention relates to a process for the preparation of coated peroxygen compounds, in particular coated sodium percarbonate with an increased active oxygen stability.

Many peroxygen compounds, also called active oxygen compounds, such as sodium percarbonate (2 $Na_2CO_3 \cdot 3H_2O_2$) and sodium perborate monohydrate and tetrahydrate, are used as the active oxygen component in detergents, bleaching compositions and cleaning compositions. Because of the inadequate storage stability of sodium percarbonate in a warm-humid environment and in the presence of various components of detergents and cleaning compositions, sodium percarbonate must be stabilized against the loss of active oxygen (Oa). An essential principle of the stabilization consists of surrounding the sodium percarbonate particles with a coating of components having a stabilizing action.

Various substances and substance combinations which are applied in one or more layers to a core of sodium percarbonate have been proposed for stabilizing sodium percarbonate. Examples of coating components are: hydrate-forming inorganic compounds, such as sodium sulfate, magnesium sulfate, alkali metal carbonates and bicarbonates, and furthermore alkali metal silicates, alkali metal and alkaline earth metal borates and alkali metal and magnesium salts of organic carboxylic acids, such as fatty acids and citric acid. Coating of sodium percarbonate and other peroxygen compounds is at present chiefly carried out in fluidized bed processes, wherein a solution of the coating components is applied to seeds in a fluidized bed and water is evaporated off. Reference is made to DE-OS 24 17 572, German Patent 26 22 610 (corresponds to U.S. Pat. No. 4,105,827), WO 95/02555 and WO 97/19890 by way of example.

In the known fluidized bed coating of sodium percarbonate, 0.5 to 25 wt.% of coating components is applied. Although the stability increases as the amount of coating increases, the active oxygen content also decreases. There is accordingly an interest in minimizing the content of coating components in coated sodium percarbonate, while maintaining a good stability in detergents. While fluidized bed coating has proved to be superior to other coating processes, for example coating in a mixer with subsequent drying, the inventors of the present application have demonstrated by dyeing experiments that coating using a fluidized bed reactor with a conventional inflow base, for example a perforated or sieve base or so-called Conidurboden®, is incomplete both in a discontinuous procedure and quite so in a continuous procedure. This deficiency, which manifests itself in an inadequate stability of the active oxygen compound, can be overcome only by applying a thicker coating layer, although at the expense of a low active oxygen content.

An object of the present invention was accordingly to coat active oxygen compounds, in particular sodium percarbonate, in a fluidized bed, in such a way that a higher storage stability can be obtained for a given amount of coating than in the case with conventional methods.

SUMMARY OF THE INVENTION

The above and other objects of the invention can be achieved by spraying an aqueous solution containing one or more coating components on to particles of sodium percarbonate in a fluidized bed chamber and then drying by flowing a fluidizing gas through the inflow base of the fluidized bed chamber in the temperature range of 30 to 70° C.

It is a feature of the invention that a radial inflow tray is used for this purpose wherein the passage openings allow the fluidized bed gas to emerge in the region of the openings at an angle of less than 35°, measured with respect to the horizontal, in the form of aligned partial streams, and further wherein the spray nozzles are arranged such that the spray pulse points in the same direction as the pulse of the fluidizing gas.

The process of the invention has been found to be suitable for the preparation of coated peroxygen compounds in general, and in particular for the production of coated sodium percarbonate with an increased active oxygen stability. The desired results intended to be obtained herein can be achieved by using fluidized bed coating apparatus as described herein and by spraying of an aqueous solution comprising one or more coating components on to particles of the peroxygen compound. A variety of coating components can be used but the most common one is sodium sulfate. A fluidized bed chamber of the design described herein is used. Drying by means of a fluidizing gas flowing through the inflow base of the chamber at a fluidized bed temperature in the range from 30 to 70° C. is an important parameter. Of particular importance is that a radial inflow tray is used, the passage openings of which allow the fluidizing gas to emerge in the region of the opening into the chamber at an angle of less than 35°, measured with respect to the horizontal, in the form of directed partial streams. In this configuration the spray nozzles are arranged such that the pulses of the sprayed compound are oriented in the same direction as the pulses of the injected fluidizing gas.

According to a particularly preferred embodiment, the coating is carried out discontinuously in a circular reactor with a circular inflow base of lamellae overlapping like turbine blades and nozzles aligned in the inflow base in the direction of rotation of the fluidized bed. Due to the powerful spin of the partial streams, the particles are mixed thoroughly in this reactor and the particles are forced to pass repeatedly through the spray cones of the nozzles.

Using a fluidized bed apparatus with the features according to the claims, it has been possible to achieve a surprisingly higher storage stability for a given amount of coating in an unexpected manner. Using sodium sulfate as the only coating agent, it is therefore possible to achieve the stability level of sodium perborate monohydrate with an amount of coating of between 3 and 7 wt. % sodium sulfate. The smaller the average particle diameter of the material to be coated, the higher the amount of coating chosen, and vice versa.

BRIEF DESCRIPTION OF THE DRAWING

The FIGURE shows a schematic flow chart of a unit for the coating according to the invention.

DETAILED DESCRIPTION OF THE INVENTION

Figure 1:
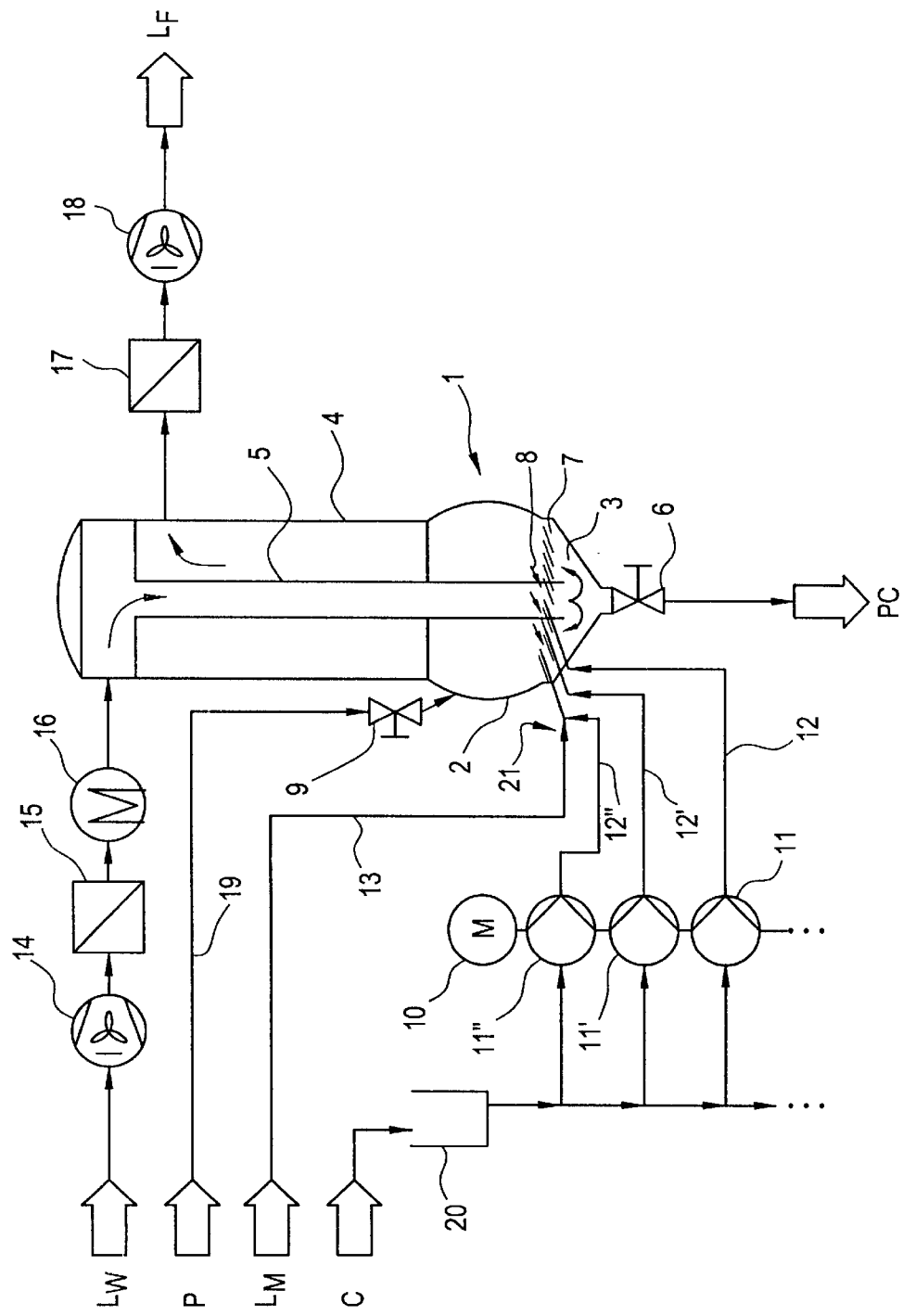

The present invention will now be described in further detail by referring to the accompanying drawing wherein the fluidized bed reactor 1 comprises a fluidized bed chamber 2, an intake air box 3, an upper part 4 of the fluidized bed reactor serving as a calming space, an inflow base 7 of overlapping lamellae, a central intake air pipe 5 extending under the inflow base 7 which acts as a distributor base, spray nozzles 8 with an alignment corresponding to the pulse of the fluidizing gas, a discharge device 6 for the coated product, and feed device 9 for charging the reactor with non-coated product. The fluidizing gas can also be fed directly to the intake air box 3 instead of by means of the central pipe 5.

In the FIGURE, for demonstration purposes the lamellae of the circular inflow base 7 and nozzles 8 are shown differently to that which corresponds to the section through the reactor—the overlapping of the lamellae and the preferred alignment of the nozzles is demonstrated. The air $L_W$ for forming the fluidized bed and drying is sucked in by means of a fan 14, purified in a filter 15, brought to temperature in a damper register 16 and passed through the intake air pipe 5 under the inflow base 7. The dust is removed from the gas emerging from the reactor in the filter 17, and the gas is fed to the environment as damp waste gas $L_F$ by means of a waste gas fan 18. The process can of course also be operated with only a waste gas fan (exhaust fan) 18.

Product P to be coated is fed via line 19 and the feed device 9 to the reactor. A solution containing the coating agent C is fed from the tank 20 by means of the pumps 11, 11' and 11" which are driven by a common motor 10, via the lines 12, 12' and 12" to the nozzles 8, 8', 8".

Spraying air and air $L_M$ for establishing a microclimate are fed simultaneously via line 13 to the 3-way two-component nozzles 21. The central pipe of the nozzle is charged with the coating solution, the annular gap arranged around it with spraying air, and the outermost annular gap with microclimate air. For clarity, not all the air lines and not all the nozzles with associated pumps have been drawn in the FIGURE. Coated product PC is removed from the reactor via the withdrawal device 6.

The construction of the inflow base and associated arrangement of the nozzles is a feature essential to the invention. The passage openings for the fluidized bed gas should be constructed such that an as far as possible strong horizontal component results in the air stream. The part streams should preferably emerge jet-like from the directed base openings or gaps. The openings are expediently constructed in the form of gaps which are formed from overlapping lamellae placed flat. A particularly preferred embodiment of the inflow base is known from German Patent 38 39 723 (corresponds to U.S. Pat. No. 4,970,804 incorporated herein by reference)—here the lower part of the reactor is constructed in spherical form. In the operating state, the angle of the lamellae to the horizontal is 5° to 35°, in particular 5° to 25°. The lamellae are arranged axially symmetrically and can be positioned vertical for emptying the reactor. Alternatively, the reactor can also be emptied through a lateral take-off arranged above the inflow base. German Patent 38 39 723 is relied on and incorporated herein by reference.

According to a preferred embodiment, the nozzles are 3-way two-component nozzles such as are known from German Patent 38 06 537, incorporated herein by reference. In addition to the channel for the coating solution to be sprayed and the spraying air, this nozzle comprises an annular channel arranged around it for feeding in air of a given temperature and moisture content for the purpose of generating a microclimate in/around the spray cone, which means that too rapid evaporation and in particular encrustations on the nozzles are avoided.

Conventional two-component nozzles can be used for spraying the coating solution, but the pulse of the nozzle must point in the direction of the pulse of the fluidized bed gas. The pulse vector of the sprayed solution here does not have to be identical to the pulse vector of the gas, but only point in the same direction. The axis of the nozzle is preferably approximately parallel to the inclination of the lamellae. It is particularly advantageous to arrange the nozzles between the lamellae approximately radially to the container axis in the direction of flow of the gas such that the nozzle tip is outside the overlapping lamellae. The process is suitable for the preparation of coated peroxygen compounds, in particular for coating sodium percarbonate (2 $Na_2CO_3 \cdot 3\ H_2O_2$). While sodium perborate monohydrate at present is employed in non-coated form in detergents, bleaching compositions and cleaning compositions, coating of sodium percarbonate often seems essential to achieve an acceptable storage stability. Surprisingly, the process according to the invention makes it possible for a storage stability which reaches or exceeds that of non-coated sodium perborate monohydrate, as the reference substance, to be achieved with little coating material—about 3 to 7 wt. %, depending on the particle spectrum.

As has been demonstrated with the aid of coloured coating solutions, the process according to the invention leads to a substantially more uniformly coated and therefore more stable product compared with sodium percarbonate coated in fluidized bed reactors with a sieve or perforated base or Conidurboden. The storage stability of sodium perborate monohydrate can of course also be increased by coating with a stabilizing compound or combination of compounds, for example from the group of abovementioned substances.

The invention is illustrated further in the following examples.

EXAMPLES 1 TO 6

Sodium percarbonate prepared by build-up granulation was coated with sodium sulfate in a circular laboratory fluidized bed apparatus (HKC 5 from Hüttlin, Steinen) with a ring of overlapping guide plates (=lamellae) positioned flat and three spray nozzles arranged radially in the direction of flow.

Sodium percarbonate with $d_p50=0.60$ mm (=NaPc 1) was employed in examples 1 to 5, and a sodium percarbonate with $d_p50=0.45$ mm (=NaPc 2) was employed in example 6. NaPc 1 and NaPc 2 had the following sieve analysis (% on the sieve in mm):

| Sieve (mm) | 1.4 | 1.25 | 1.0 | 0.8 | 0.7 | 0.6 | 0.5 | 0.4 | 0.3 | 0.2 | 0.1 | Residue |
|---|---|---|---|---|---|---|---|---|---|---|---|---|
| NaPc1 | 5 | 2 | 6 | 11 | 6 | 19 | 17 | 19 | 11 | 4 | 0 | 0 |
| NaPc2 | 1 | 2 | 4 | 7 | 4 | 11 | 11 | 20 | 22 | 15 | 2 | 0 |

Coating was carried out with a 20wt. % aqueous $Na_2SO_4$ solution. As can be seen from analyses of the coated products and the filter dust, approx. ⅔ of the coating agent was in the coating, and approx. ⅓ was recovered in the filter. Some of the coating layer is obviously worn away by abrasion during the coating and drying.

The reactor was charged with 5 kg sodium percarbonate, and fluidization was carried out by means of air. During the spraying, a fluidized bed temperature in the range of 30 to 65° C. was maintained. When the spraying had ended, after-drying was carried out at a fluidized bed temperature of about 70° C.

The operating conditions and analyses including the climate test can be seen from table 1. For comparison purposes, commercially available sodium perborate monohydrate and non-coated sodium percarbonate were always also co-tested in the climate test.

Climate test procedure: To determine the storage stability, coated sodium percarbonate prepared according to the invention and, for comparison purposes, non-coated starting substance and commercially available sodium perborate monohydrate in each case with the same active oxygen content are stored in detergent mixtures and the active oxygen content is determined as a function of time and related to the starting value (=Oa retained (%)):

A phosphate-free but zeolite-containing detergent powder, activator TAED and the peroxygen compound to be tested are mixed in an amount such that the mixture comprises 5% TAED and the Oa content is about 2.35 wt. %. Constituents in the detergent in wt.%: \

| Anionic surfactants | 12 |
|---|---|
| Nonionic surfactants | 8 |
| Zeolite A | 36 |
| Soda | 10 |
| Na silicates | 3 |
| Remainder incl. moisture | 31. |

800 g of the particular mixture are stored in commercially available E1 detergent packs, which are impregnated with a water-repellent agent and glued, at 30° C. and 80% relative humidity in a climatically controlled cabinet. One pack is stored per sampling date—after 4 and 8 weeks. The Oa content is determined in the conventional manner by permanganometry; the particular Oa retained in % is determined from the starting Oa content and the Oa content after 4 and 8 weeks.

TABLE 1

| Example no. | Fluidized bed temperature (° C.) | Coating ($Na_2SO_4$) Amount[1] | Duration [min] | Content (%) $Na_2SO_4$ in the coated Na percarbonate | Climate test (%) Oa retained after 4 w | 8 w |
|---|---|---|---|---|---|---|
| Pbmh[2] |  |  |  |  | 88 | 86 |
| NaPc 1 |  |  |  |  | 67 | 45 |
| 1 | 60 | 5 | 26 | 3.3 | 97 | 86 |
| 2 | 44 | 5 | 26 | 3.6 | 93 | 91 |
| 3 | 65/46[3] | 5 | 27 | 3.3 | 97 | 87 |
| 4 | 45 | 7 | 38 | 4.8 | 98 | 90 |
| 5 | 60 | 3 | 28 | 1.6 | 94 | 85 |
| 6 | 49 |  | 25 | 5.1 | 95 | 87 |

[1] Amount of $Na_2SO_4$, based on the sodium percarbonate (NaPc) employed, used as the spray solution; the fourth column indicates the analytically determined actual content.
[2] Pmbh = Sodium perborate monohydrate
[3] Start at 65° C., lowered to 46° C. after 10 min.

The process-related abraded material (dust) contained the difference in amount between the sodium sulfate employed and that found in the coated product. The results show that a very good storage stability which reaches that of sodium perborate monohydrate, or even exceeds this, is achieved with a low coating amount.

EXAMPLES 7 TO 10

Sodium percarbonate fluidized bed spray granules with an average particle size of $d_{50}=0.41$ mm (=NaPc3) were coated with sodium sulfate using a 20 wt.% $Na_2SO_4$ solution. Coating was carried out in a unit according to the accompanying FIGURE with a pilot scale reactor (reactor HKC 800 from Hüttlin). In the inflow base of lamellae arranged turbine-like were arranged 18 nozzles, which were supplied with the $Na_2SO_4$ solution and with spraying air and microclimate air by means of 18 pump heads (hose pumps) mounted on a common axle driven by an electric motor. A reduced pressure of 1,000 Pa was established in the reactor by means of the intake and waste air fan.

The sieve analysis of the sodium percarbonates employed, NaPc 1 and NaPc 2 was:

| Sieve (mm) | 1.25 | 1 | 0.8 | 0.7 | 0.6 | 0.5 | 0.4 | 0.3 | 0.2 | 0.1 | Residue |
|---|---|---|---|---|---|---|---|---|---|---|---|
| NaPc 3 | | 1 | 3 | 2 | 8 | 12 | 25 | 28 | 16 | 3 | 1 |

The following table shows the essential operating parameters and the Na$_2$SO$_4$ analyses and climate tests. It was found that sodium percarbonate coated according to the invention and with a low effective coating amount—about 3 to 5 wt.%—approximately achieves or exceeds the storage stability of sodium perborate monohydrate.

TABLE 2

| Example no. | Hold up (kg) | Fluidized bed temperature (° C.) | Coating Amount[3] (%) | Coating Duration (min) | Actual content of Na$_2$SO$_4$ in the product | Climate test (%) Oa retained after 4 w | Climate test (%) Oa retained after 8 w |
|---|---|---|---|---|---|---|---|
| For comparison Pbmh[1] | | | | | | 88 | 86 |
| NaPc 3[2] | | | | | | 56 | 32 |
| 7 | 250 | 45 | 5 | 37 | 2.2 | 90 | 83 |
| 8 | 300 | 40 | 5 | 32 | 3.1 | 89 | 82 |
| 9 | 400 | 43 | 5 | 43 | | 88 | 83 |
| 10 | 300 | 40 | 7.0 | 45 | 4.9 | 91 | 90 |

[1] Sodium perborate monohydrate non-coated
[2] non-coated sodium percarbonate = starting substance for B7 to B10
[3] Corresponding to the amount sprayed, based on the sodium percarbonate employed Comparison Example A commercially available laboratory fluidized bed dryer (type T2 from Aeromatic) with a perforated base as the inflow base (diameter 20 cm, mesh width 0.71 mm), temperature probe 10 cm and a nozzle 25 cm above the perforated base and a spray direction in countercurrent to the fluidizing gas was charged with 4,750 g sodium percarbonate. The sodium percarbonate had the same particle size spectrum as the product employed in examples 1 to 3 according to the invention. The nozzle air was opened and a pre-pressure of 4 bar was established.

The sodium percarbonate was fluidized by means of fluidizing air (250–300 m$^3$/h), the height of the fluidized bed (expanded) was approx. 20 cm. The set temperature for the fluidized bed was set at 60° C. The air entry temperature was set at 95° C. When a fluidized bed temperature of 60° C. was reached, 250 g sodium sulfate (as a 20 wt. % solution) was sprayed in by means of a nozzle (three-component nozzle, Schlick no. 946). The feed rate of the hose pump was selected such that a fluidized bed temperature in the range of 50 to 60° C. was maintained. When the feeding in had ended, the coated sodium percarbonate was dried further for 30 min at a fluidized bed temperature of 70° C. Throughout the entire duration of the experiment, the filter cleaning was operated every 3 min for 10 seconds each time.

According to analysis, the product stabilized in this way comprised 4.2 wt.% Na$_2$SO$_4$, and in the climate test showed an active oxygen retention in the detergent mixture of 88% after 4 weeks and 79% after 8 weeks. Sodium perborate monohydrate was subjected to the same climate test in parallel, as is usual: Oa retained after 4 weeks 90%, after 8 weeks 88%.

Further variations and modifications of the invention will be apparent to those skilled in the art from the foregoing and are intended to be encompassed by the claims appended hereto.

German priority application 198 30 946.5 is relied on and incorporated herein by reference.

We claim:

1. A process for the preparation of coated peroxygen compounds, comprising spraying of an aqueous solution comprising one or more coating components on to particles of the peroxygen compound in a fluidized bed chamber and drying by means of a fluidizing gas flowing through an inflow base of the chamber at a fluidized bed temperature in the range from 30 to 70° C., wherein said chamber has a radial inflow tray for the inflow of the fluidizing gas, the passage openings of which allow the fluidizing gas to emerge in the region of said openings in said tray at an angle of less than 35°, measured with respect to the horizontal, in the form of aligned partial streams, and in which spray nozzles are arranged, the pulse of which points in the same direction as the pulse of the fluidizing gas.

2. The process according to claim 1 wherein said peroxygen compound is sodium percarbonate and said process produces a coated sodium percarbonate with an increased active oxygen stability.

3. The process according to claim 1, further comprising carrying out said process in a batchwise procedure, and wherein said fluidizing gas flows through a reactor with a circular inflow base of lamellae overlapping like turbine blades and the coating components are injected by nozzles arranged in the inflow base in the direction of rotation of the fluidized bed.

4. The process according to claim 1 further comprising spraying the coating solution through nozzles with a central opening for the liquid, a spraying gas is introduced through an annular gap and a microclimate gas is introduced through a gap.

5. The process according to claim 3 further comprising spraying the coating solution through nozzles with a central opening for the liquid, a spraying gas is introduced through an annular gap and a microclimate gas is introduced through a gap.

6. The process according to claim 1, wherein sodium percarbonate is coated, by spraying the coating solution until the amount of coating on the sodium percarbonate core is 2 to 7 wt. %.

7. The process according to claim 3, wherein sodium percarbonate is coated, by spraying the coating solution until the amount of coating on the sodium percarbonate core is 2 to 7 wt. %.

8. The process according to claim 4, wherein sodium percarbonate is coated, by spraying the coating solution until the amount of coating on the sodium percarbonate core is 2 to 7 wt. %.

9. The process according to claim 4, wherein sodium percarbonate is coated, by spraying the coating solution until the amount of coating on the sodium percarbonate core is 3 to 5 wt. %.

10. A stabilized sodium percarbonate produced by the process according to claim 1.

11. A detergent, bleach or cleaning composition containing a stabilized sodium percarbonate according to claim 10.

* * * * *